United States Patent [19]
Karagoz et al.

[11] Patent Number: 5,299,225
[45] Date of Patent: Mar. 29, 1994

[54] GRAPHITIZATION FURNACE

[75] Inventors: Berch Y. Karagoz, Grand Island; Joseph M. Rua, Tonawanda; Lyman T. Moore, Niagara Falls, all of N.Y.; Larry E. Ledford, Valdese, N.C.; Donald P. Allen, Niagara Falls, N.Y.; Gregory Agnello, Niagara Falls, N.Y.; Thomas E. Fleckenstein, Ransomville, N.Y.

[73] Assignee: Sigri Great Lakes Carbon Corp., Briarcliff Manor, N.Y.

[21] Appl. No.: 886,062

[22] Filed: May 20, 1992

[51] Int. Cl.⁵ .............................. F27D 3/00
[52] U.S. Cl. ........................ 373/115; 373/88; 373/110; 373/120; 62/216; 264/27; 428/408
[58] Field of Search ............ 373/88, 91, 93, 114, 373/115, 120, 125, 110; 62/216; 264/27; 428/408

[56]  References Cited
U.S. PATENT DOCUMENTS

| | | | |
|---|---|---|---|
| H520 | 9/1988 | Johnson et al. | 156/617.1 |
| 1,029,121 | 6/1912 | Heroult | 373/114 |
| 3,843,106 | 10/1974 | Nanjyo et al. | 373/76 |
| 3,947,621 | 3/1976 | Collin et al. | 373/122 |
| 4,015,068 | 3/1977 | Vohler | 373/110 |
| 4,017,673 | 4/1977 | Michels et al. | 373/133 |
| 4,394,766 | 7/1983 | Karagoz | 373/120 |
| 4,475,207 | 10/1984 | Karagoz | 373/115 |
| 4,916,714 | 4/1990 | Antoni et al. | 373/120 |
| 5,117,439 | 5/1992 | Dagata et al. | 373/88 |

Primary Examiner—Bruce A. Reynolds
Assistant Examiner—Tu Hoang
Attorney, Agent, or Firm—Adrian J. Good

[57] ABSTRACT

A lengthwise graphitization furnace for the conversion of a string of amorphous carbon bodies to graphite has an open semi-cylindrical shell of corrugated steel modules lined with cast refractory. The combination of the corrugated shell and cast refractory liner contributes to faster heat transfer by both convection and radiation, and to greater mechanical and thermal stability. The furnace is designed in modules allowing for easy replacement of worn components.

12 Claims, 14 Drawing Sheets

GRAPHITIZATION FURNACE

BACKGROUND OF THE INVENTION

The invention relates to a method and apparatus for carrying out the production of graphite electrodes and other graphitized bodies. A great variety of electrochemical and metallurgical processes are carried out with the use of carbon and graphite electrodes. In this context it should be understood that the word carbon denotes the amorphous form of carbon and graphite denotes the multilayered hexagonal crystalline form of carbon.

Carbon and graphite electrodes are used in many electrochemical processes, including the production of magnesium, chlorine, iodine, phosphorus, steel, and the production of aluminum in Hall cells.

Carbon electrodes consist of the essentially amorphous carbon from petroleum coke which has been calcined, ground, classified by size, mixed with a binder, and bound in a matrix of amorphous carbon derived from the binder after baking at temperatures of approximately 700° C. to 1100° C. in a baking furnace. Graphite electrodes are produced from the carbon forms by placing them in an Acheson furnace and in recent years in a Lengthwise Graphitization (LWG) type furnace and heating them to a temperature between 2500° C. to 3000° C., which converts the amorphous form of carbon to the crystalline graphite, and vaporizes most of the impurities present in the original carbon, including most metals and sulfur compounds. Graphite, compared to amorphous carbon has much higher electrical and thermal conductivity, lower coefficient of thermal expansion (CTE), superior ductility and vastly superior thermal shock resistance at the operating temperatures of the electric arc steel furnace. These physical properties are uniquely valuable in the electric furnace with its need for high electrical currents, and the need to resist the mechanical and thermal shock suffered by the electrodes from the falling scrap, fluctuations in metal and electrode level, and generally high thermal stresses. Consequently, graphite is universally used as an electrode in the electric arc melting of steel.

The production of graphite electrodes from the so-called carbon electrodes had traditionally been carried out in the Acheson furnace in which the electrodes are typically placed in a transverse orientation to the flow of the electrical current, and surrounded by a resistor medium, thereby causing the current to pass alternately through tiers of electrodes and resistor media, the latter being typically metallurgical or petroleum coke. The Acheson process is of such ancient vintage and so well known as not to require any further description. The LWG process, although very old, is less well known and has been practiced on a commercial scale only in recent years. The LWG process is carried out by arranging the carbon electrodes in a continuous column with an electrical connection at each end of the column. See U.S. Pat. No. 1,029,121 Heroult, Cl. 13/7 Jun. 11, 1912 and U.S. Pat. No. 4,015,068, Vohler, Mar. 29, 1977, Cl. 13/7. In the LWG process, the electrodes themselves form the dominant path for the heating current, with one or both of the ends of the column subjected to a mechanical or hydrostatic pressure source in order to keep the connection tight under expansion or contraction of the column during the heating cycle. A packing medium of granular coke is used for insulation, however, Vohler does not use a packing medium, but discloses a metal shell with a felt liner as insulation.

The LWG process has many advantages over the Acheson process. The energy efficiency is much higher, as the material is heated directly instead of indirectly, and the cycle time for the process is much faster taking typically less than 12 hours as compared to 60 to 120 hours for the Acheson process.

U.S. Pat. No. 4,394,766 issued Jul. 19, 1983 describes an LWG furnace and U.S. Pat. No. 4,475,207 describes a loading apparatus for such a furnace, referred to herein as a strongback.

SUMMARY OF THE INVENTION

An improved LWG furnace of modular design comprising roughly semi-circular shell coupled by expansion joints in which a pressure seal is held in place by deadweights. The shell is formed of corrugated steel panels with castable ceramic lining. The panel design allows more freedom for thermal expansion in the transverse direction while accommodating longitudinal expansion by freedom to slide over its support cradle. The corrugated panel design also enhances faster cooling of the furnace after off-fire by improved heat transfer in comparison to a simple steel plate structure. The corrugated structure has a higher surface area than a simple plate, which gives more radiative cooling and turbulent air movement giving more convective cooling.

At each end of the furnace there is a head wall assembly through which power is brought in by a contact electrode, through a castable refractory which is removed mechanically when repairs are made.

The modular system of construction lends itself to volume production and dimensionally, highly accurate fabrication thus enhancing complete interchangeability of the furnace shell modules.

The shell system may have bottom ports for bottom-dump type unloading of the graphitization media or may use vacuum or mechanical unloading.

The refractory lined metal panels coupled with ceramic gasketed suspension joints render the furnace relatively gas tight, making the containment and collection of gaseous or particulate pollutants either by a vented cover or hood relatively simple, for easy and effective environmental control of these pollutants.

This furnace has a low heat capacity in contrast to all refractory block furnaces and also has a much faster cooling rate after off-fire due to the additional surface area and convective cooling produced by the corrugated panel shell. This allows the furnace to cool down faster than older designs after the amorphous carbon electrodes are converted to graphite, and the electrodes removed. This faster cooling provides a quicker turnaround time and increased production speed and capacity.

We have also found that our furnace produces higher quality electrodes than previous designs, due to its mechanical and thermal stability, and the consequent uniformity and controllability of the graphitization conditions.

The furnace has great structural and thermal stability which gives it a long useful life and makes it suitable for stationary as well as movable furnace applications. The unique combination of castable refractory lining integrated with the corrugated steel of suitable gauge thickness by means of welded wire anchors provides a sturdy composite structure analogous to reinforced concrete beams or slabs; where imposed horizontal and downward loads within the furnace result in compressive stresses within the refractory linings and tensilly stressing the steel corrugation. Use of the corrugated steel panels and corrugated steel support modules also serves to accommodate differential movement caused by thermal expansion at elevated temperatures and contraction during cool down without warping or permanent deformation.

The head walls of the furnace are also of modular design, suspended and stabilized by structural members incorporated into the end shell design.

The furnace is loaded by means of a strongback carrying a preloaded column of carbon electrodes. The strongback is supported on truss assemblies which are accurately positioned by and secured to the structure of the main shell assemblies, with provision to transmit the strongback load directly to ground thru an electrically isolated pier arrangement.

The side panel sections are held in place by a structurally stable bracket arrangement which allows thermal movement and easy replacement.

The electrodes at the ends may have current spreaders holding the electrode strings under pressure while applying current, which allows for twin or multiple stranding of electrode columns.

Each shell section consists of multiple panels comprising conventional corrugated steel sheets lined with castable refractory. Welded anchors hold the castable refractory secure to the corrugation.

The head wall assembly is adjustable for accurate alignment and keyed to the end shell assembly with brackets for stability.

The rigid structure of this furnace design may be built in any geometric configuration, in contrast to the structure shown in U.S. Pat. No. 4,394,766, which has the furnace structure suspended in tension, which limits the configuration to that of a relatively narrow and deeper "U" shaped cross-section.

SUMMARY OF THE INVENTION

A bed of particulate coke medium is placed in the bottom of the furnace and a string of baked amorphous carbon electrodes placed on the bed between the two head electrodes by a strongback precisely positioned on the furnace. The furnace is filled with coke medium and pressure and current applied to the string. After the electrode string is graphitized, the current is turned off and the furnace allowed to cool and be unloaded.

BRIEF DESCRIPTION OF THE PREFERRED EMBODIMENTS.

DESCRIPTION OF THE DRAWINGS

Figure 1:
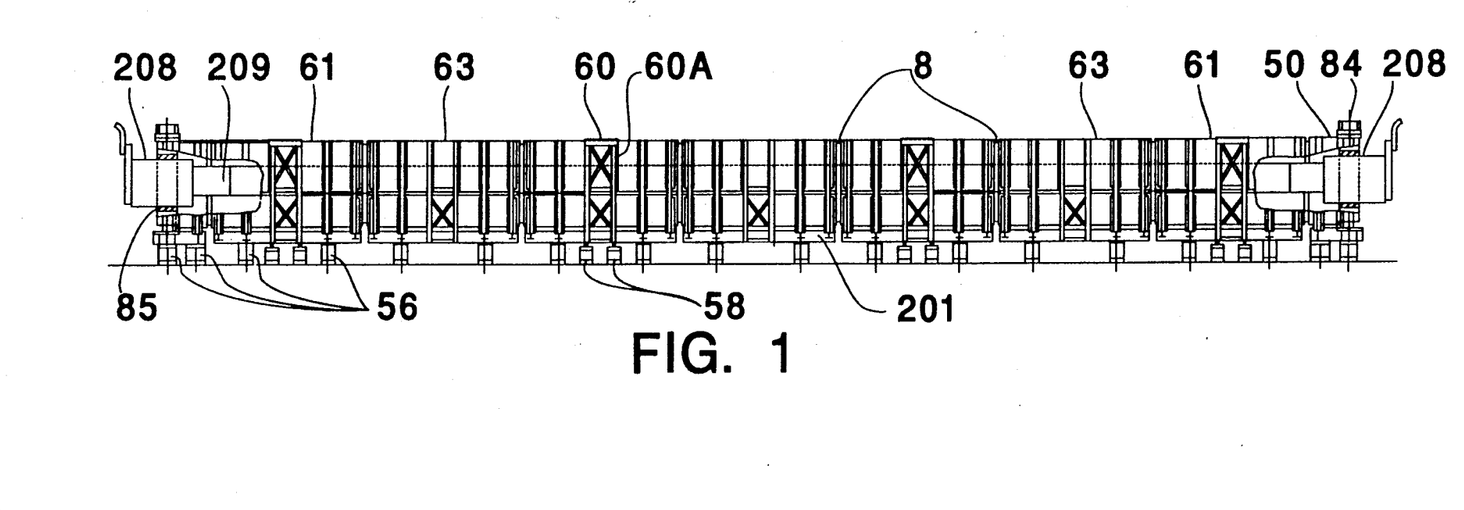
FIG. 1 is an elevation section of the furnace in accordance with the invention.

FIG. 1 is an elevation section of the furnace with main shell assemblies 61 and 63 and end shell assembly 50 supported by refractory piers 56 for electrical isolation. Head electrodes 208 supported by head electrode bushing 85 and head wall 84, apply pressure and current to the electrode column 209 converting carbon to graphite.

Expansion joints 8 serve to couple adjacent furnace shell assemblies to retain the granular insulating media (not shown), to accommodate relative thermal movements, as well as assure electrical isolation between adjacent shells.

Figure 1A:
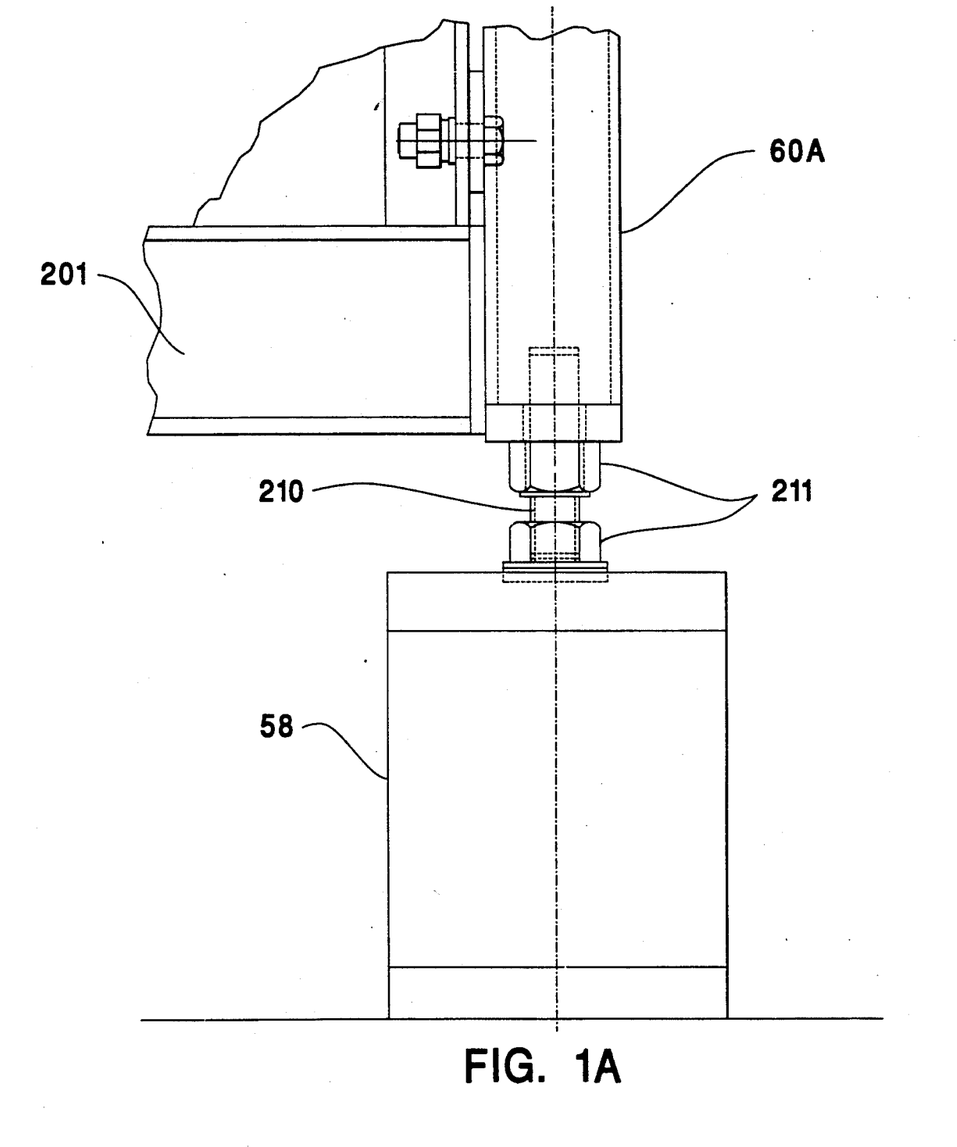
FIG. 1A is a perspective view of the supporting section in accordance with the invention.

The furnace is loaded by strongback, not shown, supported and aligned on support bar 60 and support truss assembly 60A which are attached to the structural frame 201 of the furnace. FIG. 1A (3891) shows refractory piers 58 and a threaded rod 210 and nuts 211 which transmit the load of the strongback to ground through the electrical isolation of piers 58.

Figure 2:
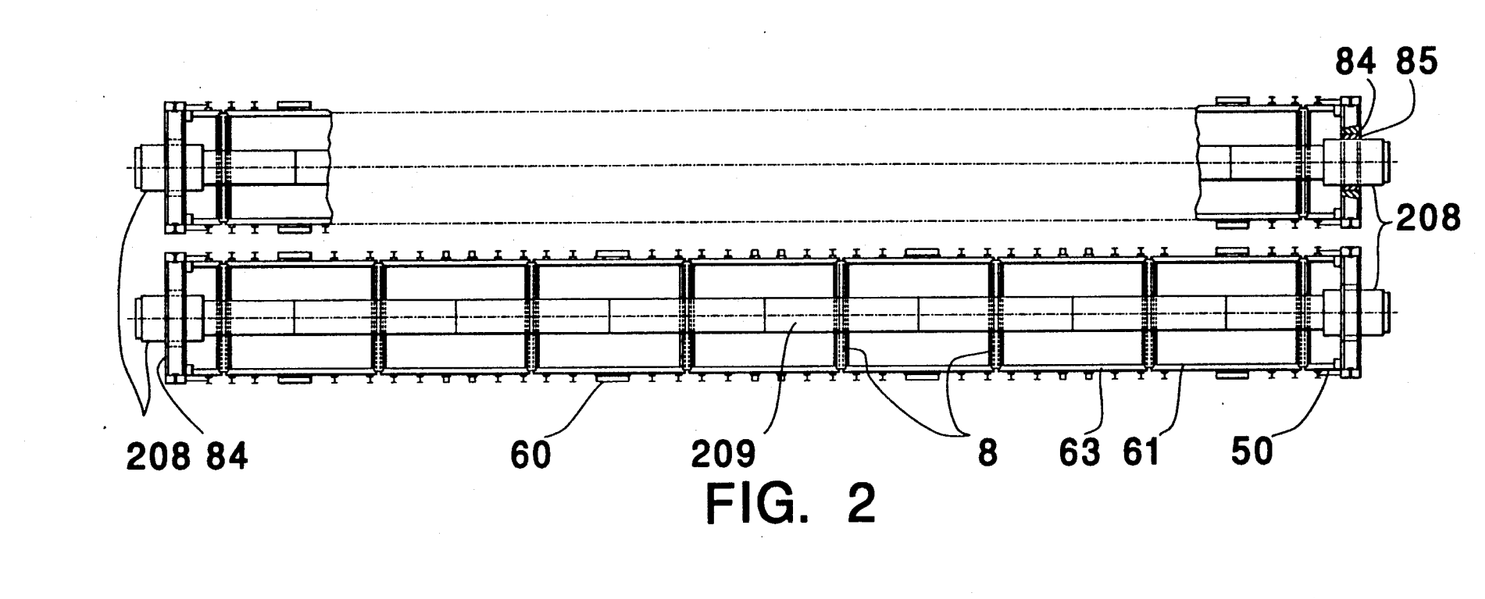
FIG. 2 is a plan view of the furnace in accordance with the invention.

FIG. 2 is a plan view of the furnace.

Figure 3:
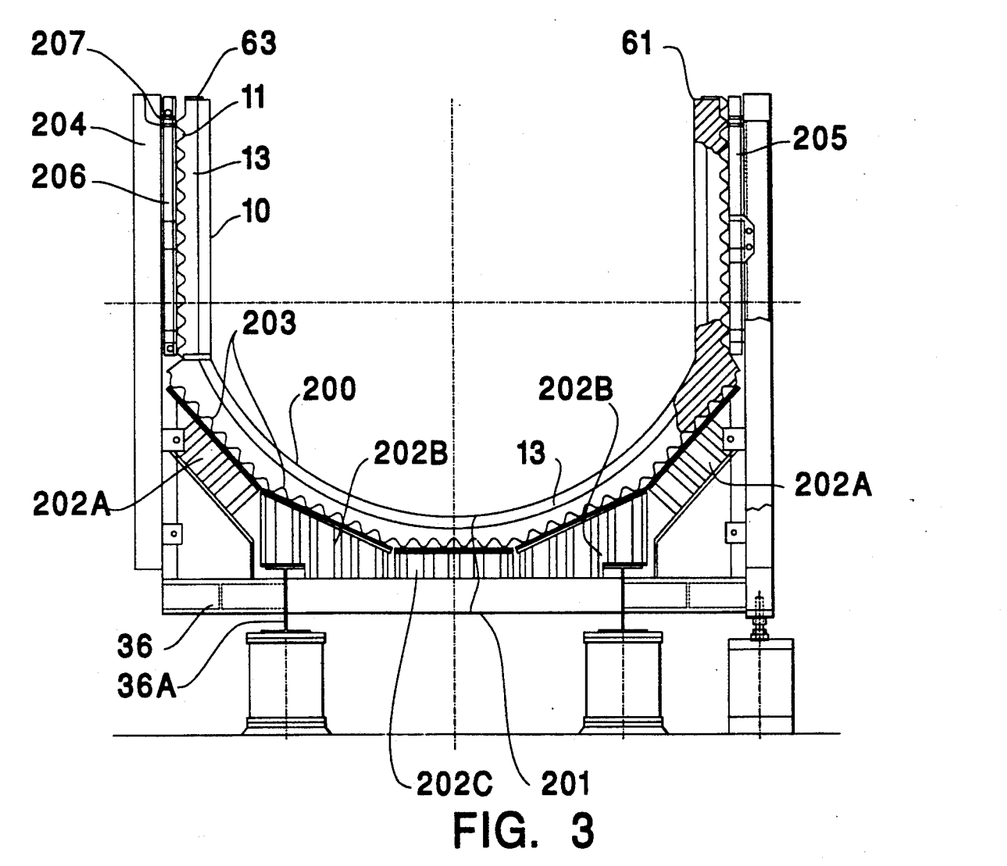
FIG. 3 is a vertical cross-section of the furnace in accordance with the invention.

FIG. 3 is a vertical cross-section of the furnace through a main shell assembly 61 or 63 with furnace bed section 200 and side panel assemblies 10, which are independent and easily removable for replacement. Furnace bed sections 200 comprising corrugated steel bottom panels 203 are lined with castable refractory 13. Corrugated steel bottom panels 203 are supported by structural frame 201 comprising I-beams 36, 36A and weldments, and vertically corrugated support modules 202A, 202B and 202C. Side panel assemblies 10 of corrugated steel sheets 11, stiffener brackets 205 and castable refractory 13, are supported by furnace bed 200 and stabilized by vertical steel members 204 by means of coupling rods 206 and coupling tabs 207.

Figure 3A:
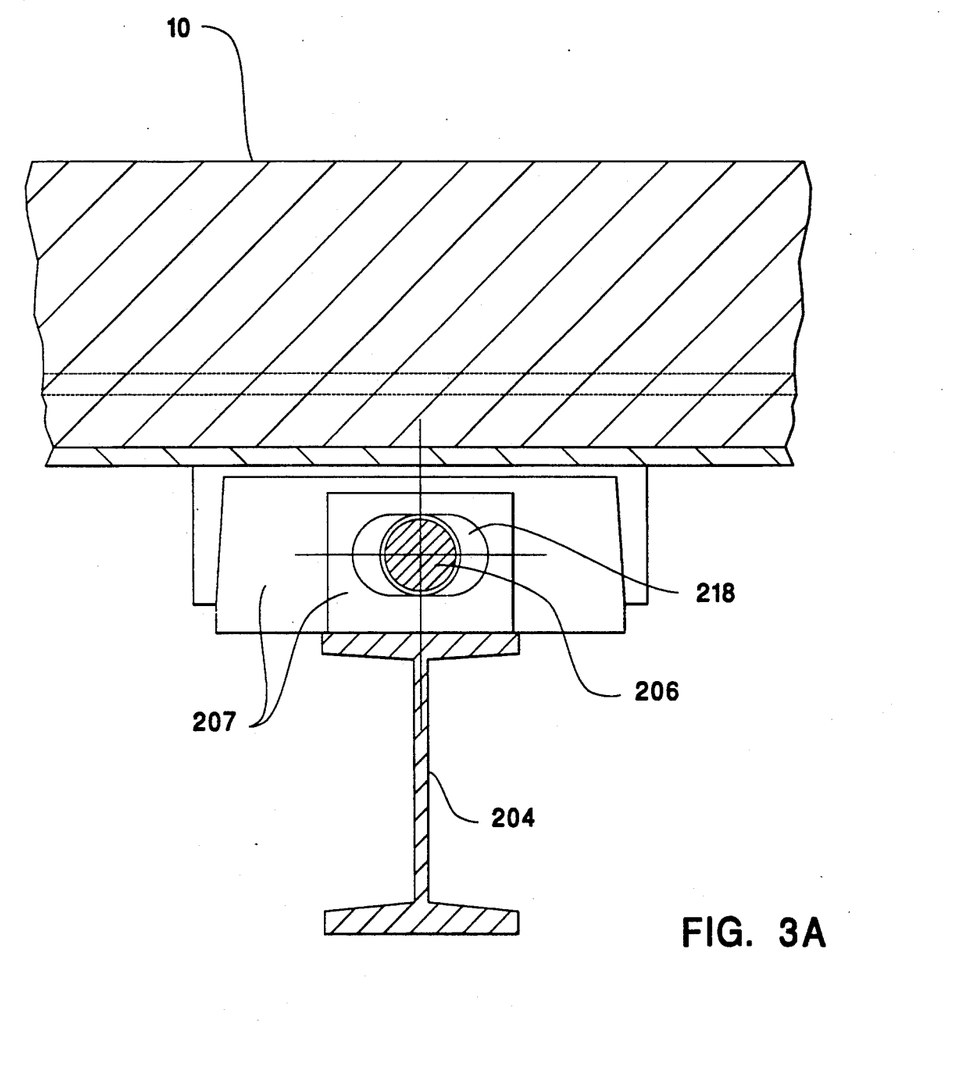
FIG. 3A is a perspective view for the bottom arrangement of the furnace in accordance with the invention.

FIG. 3A shows clearance gap 218 between coupling rods 206 and tabs 207, designed to provide for differential expansion between side panel assemblies 10 and vertical steel members 204 of the furnace. The unique arrangement of corrugated steel panels 203 and corrugated steel sheets 11 causes increased air turbulence and provides increased surface area over a flat surface; which increases heat transfer by convection and radiation, and also serves to provide better mechanical stability to withstand hydrostatic pressures from the furnace packing media while allowing for relative thermal expansion at elevated temperatures.

Figure 4:
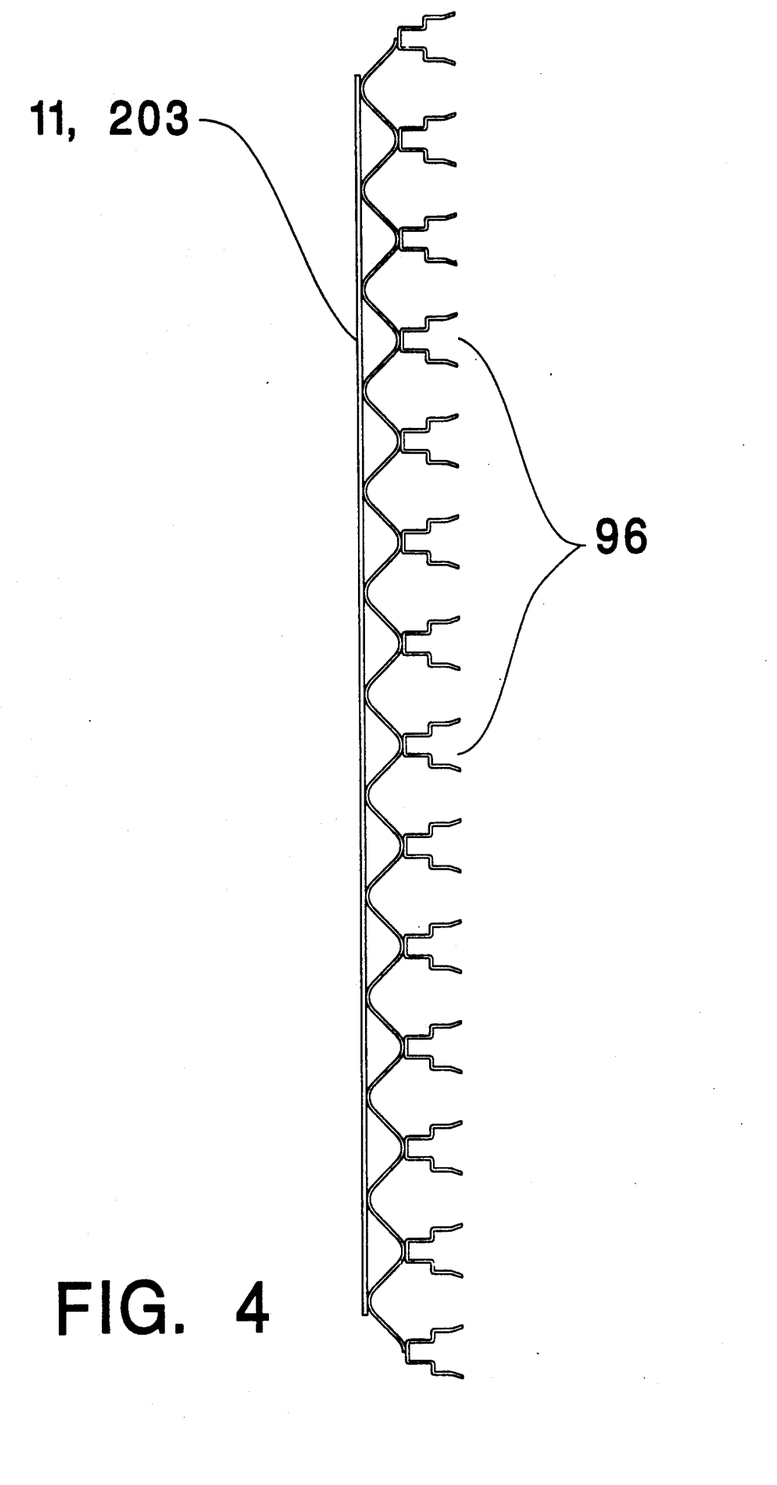
FIG. 4 is a perspective view of the refractory anchors in accordance with the invention.

FIG. 4 shows refractory anchors 96 welded to corrugated sheet panels 11 and 203.

Figure 5:
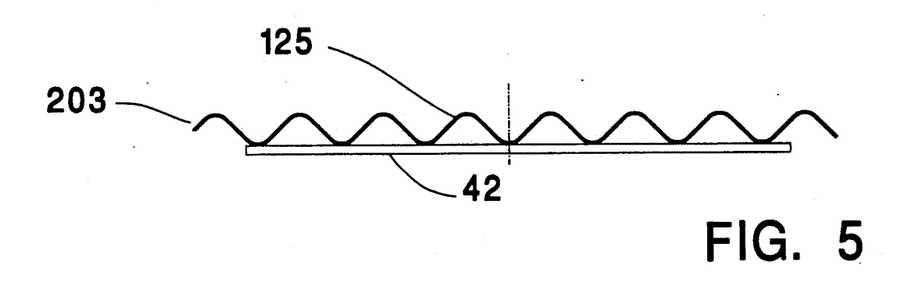
FIG. 5 is an end view of the corrugated steel bottom panels in accordance with the invention.

FIG. 5 is an end view of corrugated steel bottom panels 203 comprising corrugated sheets 125 welded to backup bars 42.

Figure 6:
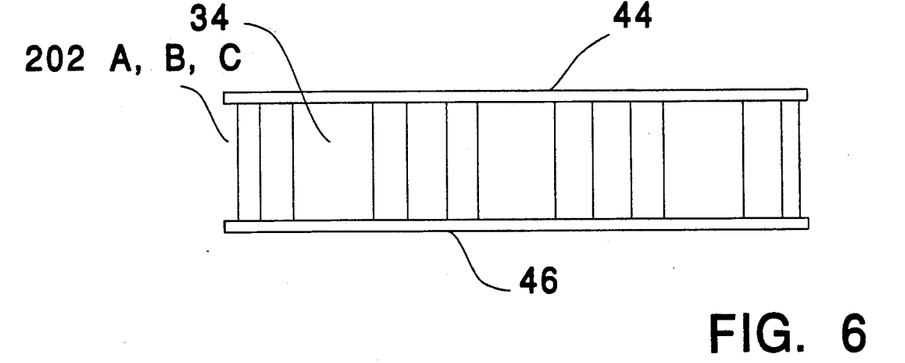
FIG. 6 is a side view of the corrugated support modules in accordance with the invention.

FIG. 6 shows a side view of corrugated support modules 202 A, B and C comprising vertical corrugations 34 welded to steel support bars 44 and 46.

Figure 7:
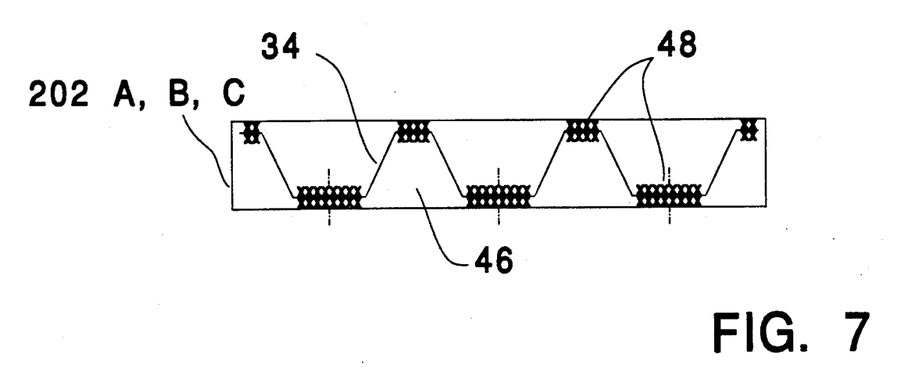
FIG. 7 is a cross-sectional view of the support modules.

FIG. 7 shows a cross-sectional view of support modules 202 A, B and C comprising corrugation 34 and bottom support bar 46. The corrugation 34 has ample cross-sectional area to support the contents and live loads imposed on the furnace, and sufficient section modulus to resist the stresses of thermal expansion and contraction, as well as the bending moments imposed by the sliding friction of the corrugated steel panels 203.

The trapezoidal cross-section of the corrugation provides for the required welding pattern 48 to resist the thermal and bending stresses described above. The top support bar 44 has the same welding pattern as the bottom support bar 46. The arrangement of support modules 202 A, B and C, FIG. 3, forms a cradle which is the key for the structural support of the corrugated steel panels 203 and the backing and stable support of the castable refractory 13 for the bottom section of the furnace.

Figure 7A:
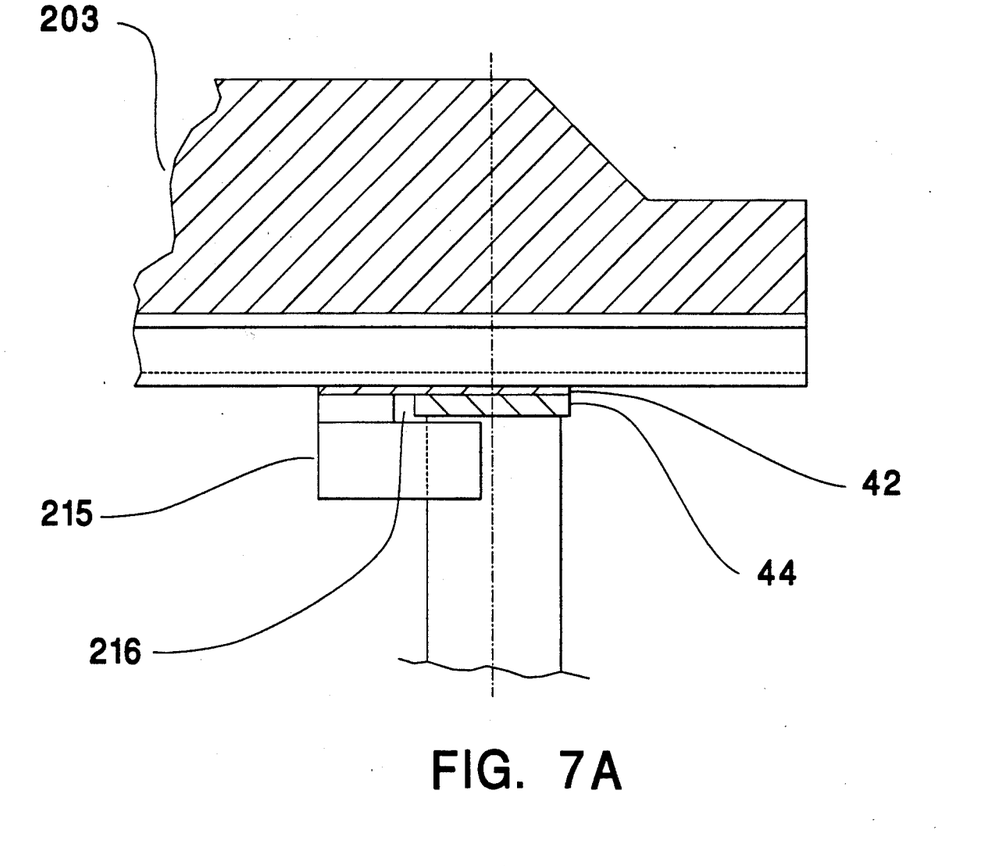
FIG. 7A is a cross-sectional view of a hold-down bracket in accordance with the invention.

FIG. 7A shows a cross-section of a hold-down bracket for bottom panels 203. Bracket 215 holds panels 203 in sliding contact between top support bar 44 and backup bar 42 while allowing for thermal movement at 216.

Figure 8:
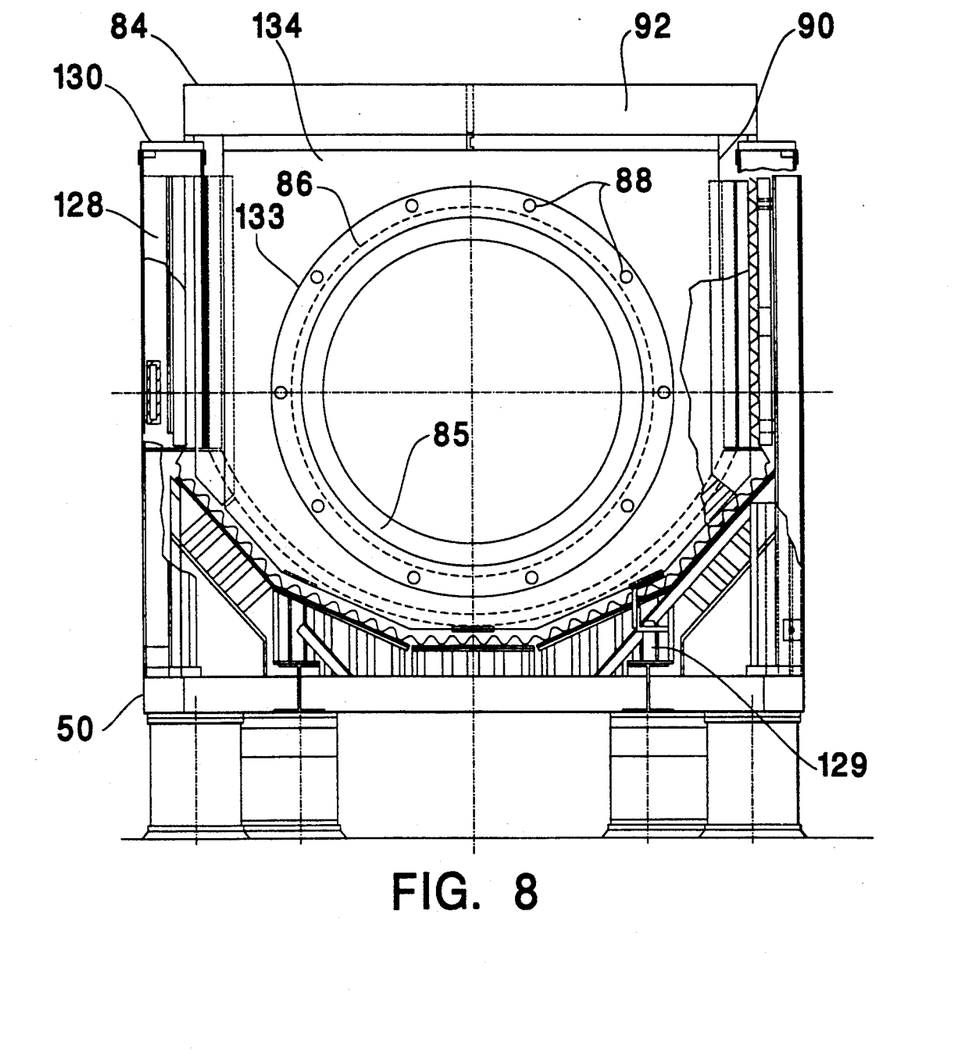
FIG. 8 and 8A are perspective views of the head wall assembly in accordance with the invention.
Figure 8A:
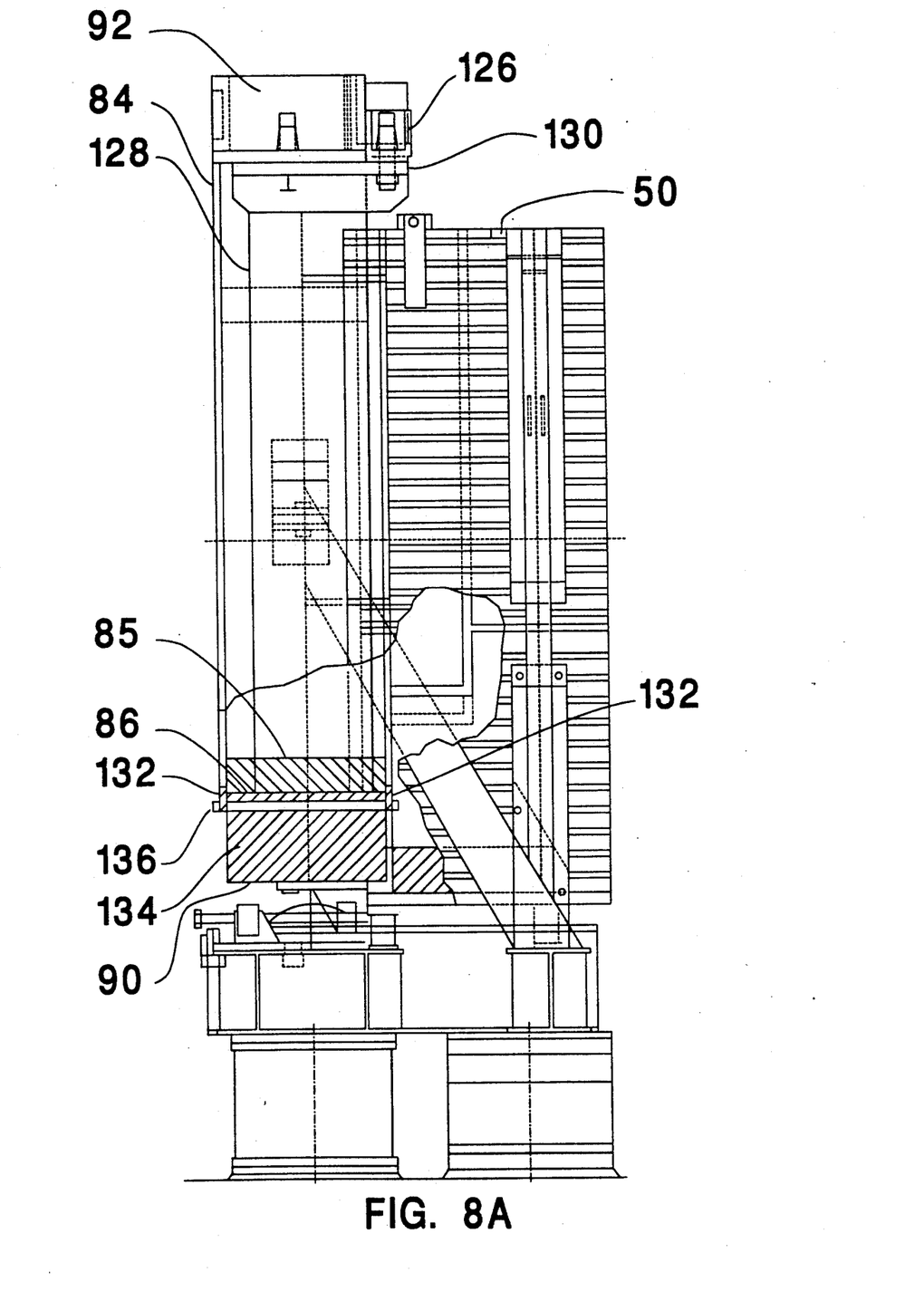

FIGS. 8 and 8A show the replaceable head wall assembly 84 of castable refractory, with thin S.S. liner 86 and bolt holes 88 which allow bolting 136 of plates 132 to hold the replaceable head electrode bushing 85 in position. The head wall castable, 134 is contained by exterior plate 90 and is suspended from cross beam 92. The head wall assembly 84 is held in place by tapered pin assemblies 126 and 129 with the load bearing member 92 supported on column 128 and top plate 130 of end shell assembly 50. Replaceable head electrode bushing 85 allows the head electrode movement.

End shell assembly 50 is similar to main shell assemblies 61 and 63 except for the head wall structural support members 128 and 130.

Figure 9:
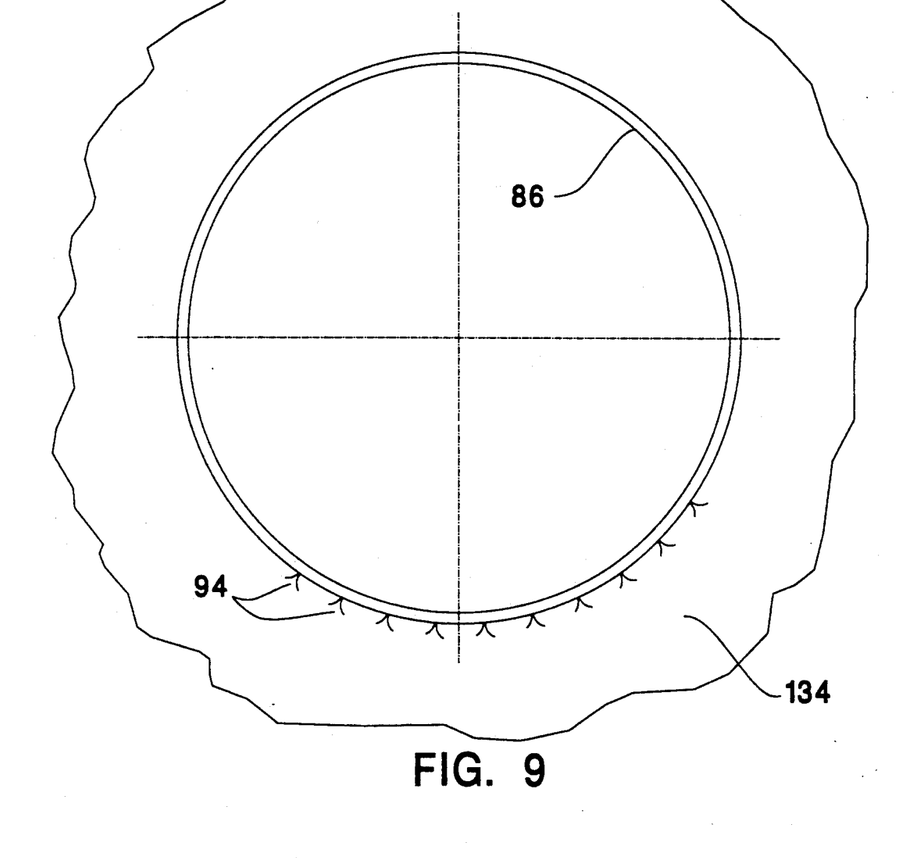
FIG. 9 is a perspective view for the liner of the end shell assembly in accordance with the invention.

FIG. 9 shows liner 86 of the end shell assembly bonded to head wall refractory 134 by Welded wire anchors 94.

Figure 10:
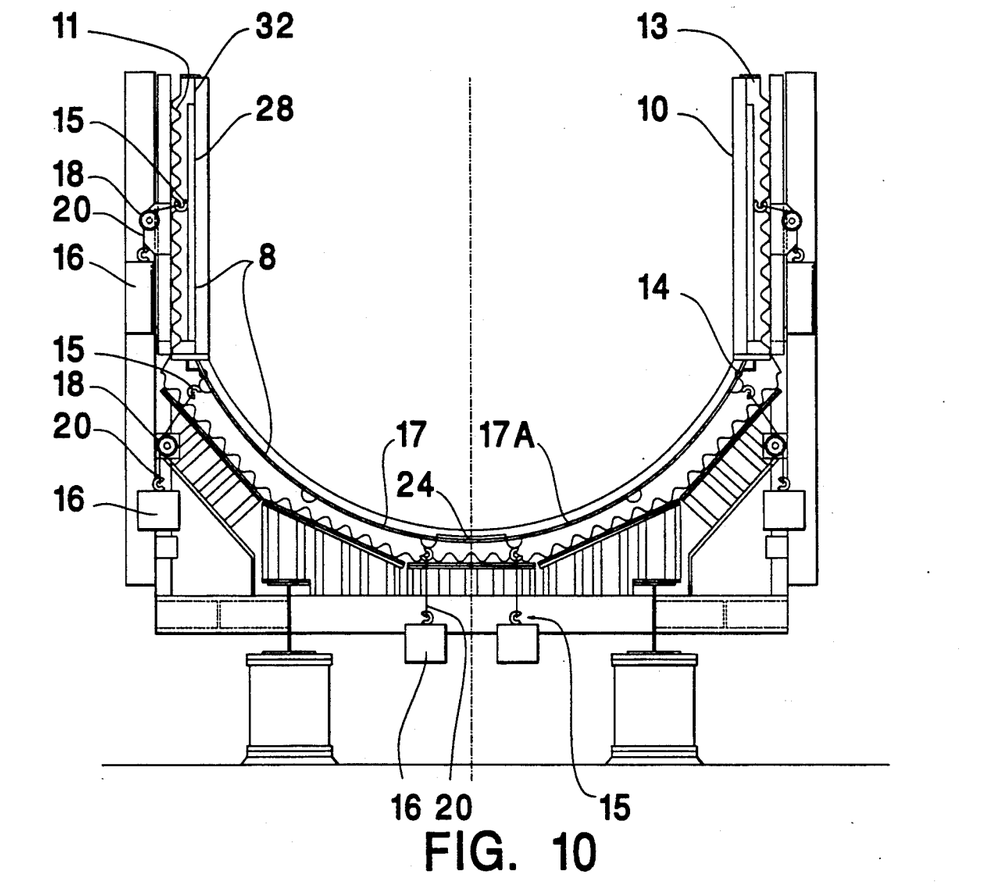
FIG. 10 is a vertical section view of the furnace with an expansion joint in accordance with the invention.

FIG. 10 is a vertical section of the furnace at an expansion joint 8 showing side panel assemblies 10 having corrugated steel sheet 11 lined with castable refractory 13. Stainless Steel side plates 28 with ceramic wool gasketing seals 32 covering the expansion joints are held in place by deadweights 16. Electrical continuity between shells is prevented by the joints. The plates are held in place by deadweights on cables 20 running over porcelain spools 18 to hooks 15. Side plates 28 are joined to bottom curved plates 17 and 17A by means of high temperature alloy bolt arrangement 14. The overlap of bottom plates 17 and 17A at 24 forms a sliding joint held in place by deadweights 16.

Figure 11:
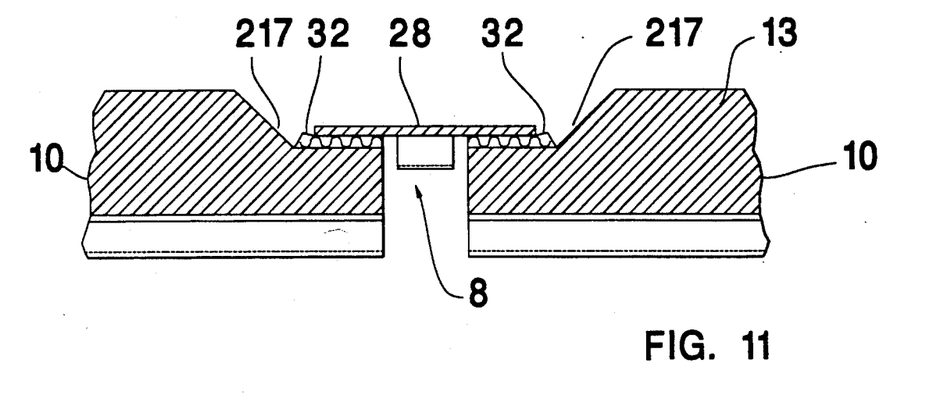
FIG. 11 is a cross-sectional view of the side expansion joint.

FIG. 11 shows a cross-section of the side expansion joint 8 with castable refractory 13, stainless steel plate 28 and ceramic wool gasket 32 held in place in refractory nest 217.

Figure 12:
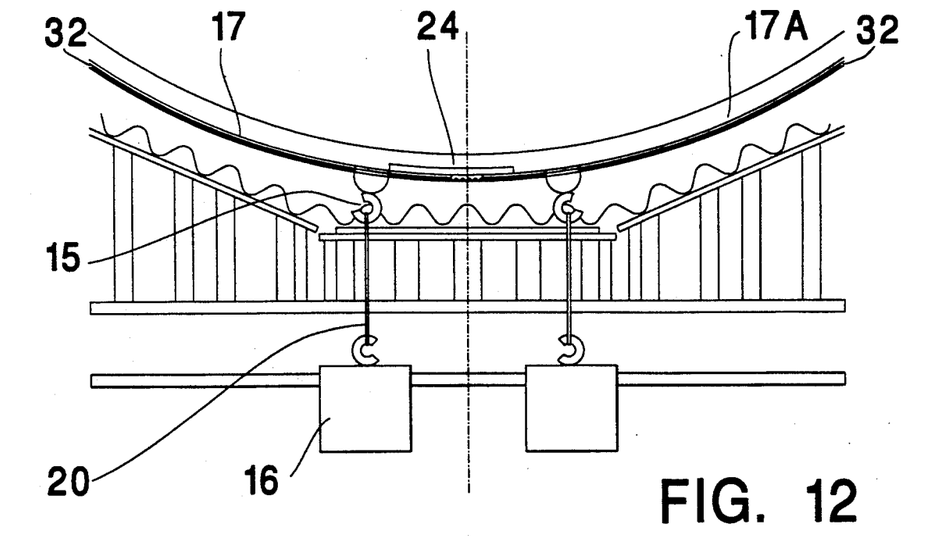
FIG. 12 is a detail of the bottom joint.

FIG. 12 is a detail of bottom joint with overlapping plates 17 and 17A at 24 ceramic wool gasket 32, and deadweights 16 holding the plates in contact while allowing for thermal movement.

Figure 13:
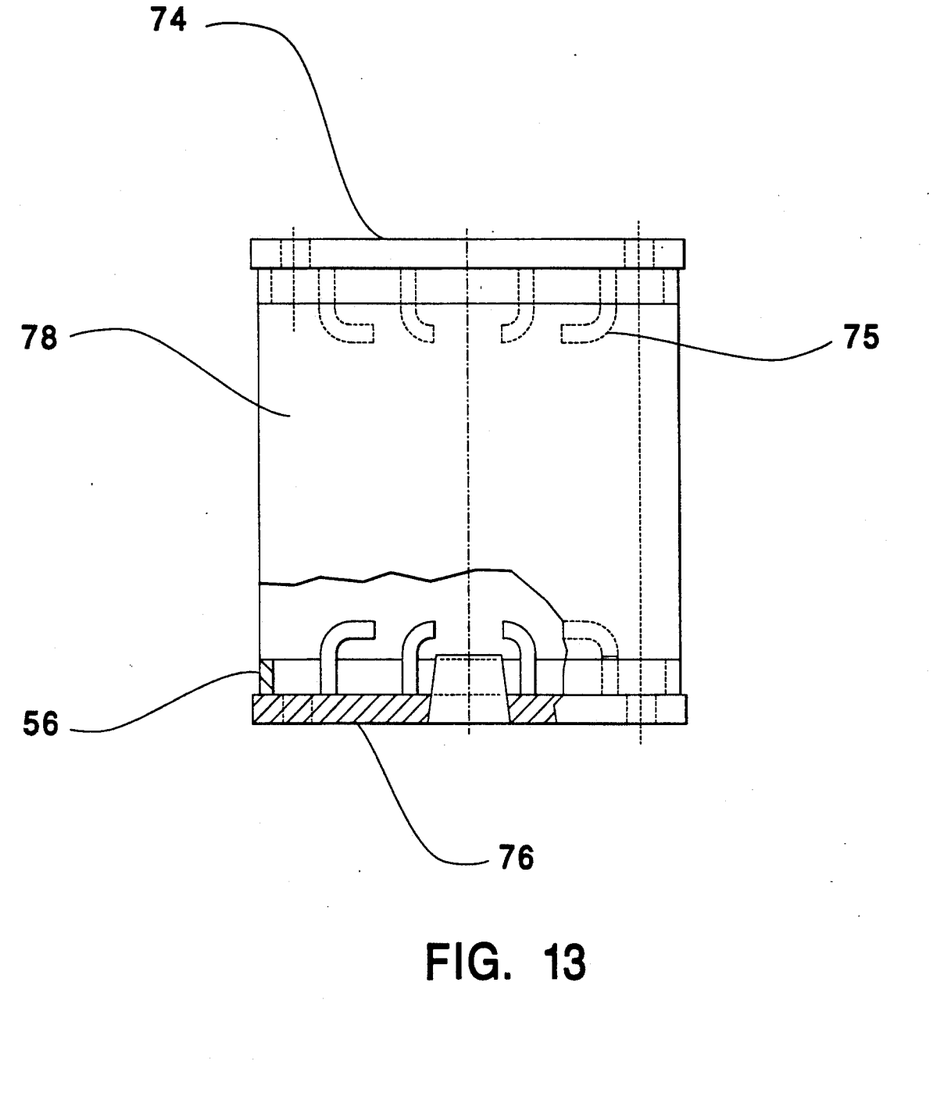
FIG. 13 is a sectional view of the piers in accordance with the invention.

FIG. 13 shows piers 56 with castable refractory 78, upper plate 74, lower plate 76 and reinforcing anchors 75 welded to upper and lower plates. These piers serve to provide electrical isolation from the furnace shells to ground while supporting the entire weight of the furnace and its contents.

We claim:

1. A graphitization furnace for the length-wise graphitization of a column of amorphous cylindrical carbon electrodes, said furnace comprising a corrugated sheet metal shell having an approximately arc-shaped semicircular lower portion, straight vertical sidewalls and an open top, the whole of said shell having a configuration of a U shaped trough supported by a framework structure on refractory piers, said furnace having at each end head wall structures comprising an end shell, an electrode suitable for supplying sufficient electrical energy to said column to heat said column to a temperature at which said amorphous carbon electrodes are converted to graphite, said furnace shell having its longitudinal axis horizontal to the earth, said refractory piers resting on a foundation on the earth.

2. The furnace as set forth in claim 1, wherein said corrugated sheet metal shell having a cast refractory liner.

3. The furnace as set forth in claim 2, wherein the refractory liner is held in place by metal anchors attached to the shell.

4. The furnace as set forth in claim 1, wherein said corrugated sheet metal further comprising a plurality of horizontally arranged modules having an approximately arc-shaped bottom and vertical sidewalls, said modules define a configuration of a U shaped trough, said modules being joined at side and bottom joints sealed with electrically and thermally insulating ceramic wool gaskets retained by metal plates, said modules having a cast refractory liner held in place by metal anchors attached to the sheet metal shell.

5. The furnace as set forth in claim 4 wherein said corrugated sheet metal shell further having a cast refractory liner held in place by metal anchors attached to the shell and comprising arc-shaped approximately semi-circular bottom and vertical side horizontally arranged modules having side and bottom expansion joints sealed with electrically and thermally insulating ceramic wool gaskets by metal plates wherein side expansion joints are held in contact by counterweights held by cables running over electrically insulating pulleys applying a horizontal force to metal plates covering the joints.

6. The furnace as set forth in claim 4, wherein the bottom of the modules comprises multiple corrugated arc-shaped panels attached to side panels comprising the vertical sidewalls, said arc-shaped panels having a sliding, overlapping, joint sealed with ceramic wool, each of said arc-shaped panels being in the approximate shape of an arc of about 90° having a sliding overlapping expansion joint sealed with ceramic wool, said joint being at the bottom of said furnace shell so as to run parallel with the longitudinal axis of said furnace shell, said arc-shaped panels held in contact at the joint by counterweights.

7. The furnace as set forth in claim 1, wherein said furnace is supported by columns resting on refractory piers, electrically isolating the furnace framework structure from ground.

8. The furnace as set forth in claim 1, wherein said furnace having at each end cast refractory head wall assemblies contained in structurally reinforced metal shells, held in place and attached to the end shells and having an opening for a head electrode supplying electrical power to graphitize the columns of carbon electrodes.

9. The furnace as set forth in claim 4, wherein each module is electrically isolated from each other by ceramic wool gaskets in a refractory nest and from ground by refractory piers, said furnace comprising modules having a corrugated sheet metal shell and a cast refractory liner held in place by metal anchors attached to the shell.

10. The furnace as set forth in claim 1, wherein a truss assembly column is attached to the framework structure of the furnace, and rests on adjustable jacking devices on insulating refractory piers, wherein said column is adapted to support a strongback apparatus for loading the furnace, aid strongback adapted to carry a column of amorphous carbon electrodes in precise end-to-end alignment to the furnace, said strongback being positioned on said column thereby positioning said column in precise alignment between two head electrodes of which one is at each of said furnace, whereby the load of the strongback is directly transmitted from the truss assembly column through said piers to a foundation.

11. The furnace as set forth in claim 4, wherein the bottoms of the furnace modules are comprised of refractory lined corrugated panels supported by support cradles comprising vertical, trapezoidally corrugated support modules welded to upper and lower bars, said support modules having sufficient section modulus to resist the thermal sliding movement of said panels relative to each other caused by thermal expansion and contraction and the stresses of the load caused by the weight of furnace contents, comprising the electrode column and the packing medium and the stress caused by the operations of loading and unloading said furnace.

12. A furnace for heating amorphous cylindrical carbon electrodes to a temperature at which the amorphous carbon is converted to graphite by the application of an electrical current to a horizontal column of said electrodes laid end to end, said furnace comprising a set of U shaped modules having an arc-shaped bottom of approximately 180° and vertical sidewalls, said modules comprising a corrugated sheet metal shell with a cast refractory liner anchored to the shell by wire anchors, said modules forming an elongated horizontal trough with each of said modules isolated electrically and thermally from each other by refractory wool retained by metal plates held in place by counterweights, said furnace having a framework structure supporting said modules in precise alignment resting on refractory piers electrically isolating said furnace from ground, said furnace having at each end an end shell with a case refractory head wall holding an electrode suitable for supply a current to said column sufficient to heat said column to a temperature at which said amorphous carbon electrodes are converted to graphite, said modules supported on support cradle structure at the bottom comprising top and bottom plates joined by trapezoidally corrugated sheet metal, said bottoms of said modules comprising to arc-shaped plates of 90° overlapping at a lowest point sealed with a ceramic wool gasket, thereby allowing limited movement caused by thermal expansion, contraction, and by stress of loading and unloading the furnace, said bottom plates held in contact at said lowest point by counterweights, said overlapping plates forming longitudinal joints in said modules, said framework structure comprising columns resting on adjustable jacking devices resting on refractory piers, said columns adapted to support a strongback structure useful for loading and unloading said electrode column, said modules isolated.

* * * * *